United States Patent
Oh

(10) Patent No.: US 10,267,558 B2
(45) Date of Patent: Apr. 23, 2019

(54) HEATING AND COOLING CUP HOLDER

(71) Applicant: Hyundai Motor Company, Seoul (KR)

(72) Inventor: Man Ju Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 151 days.

(21) Appl. No.: 15/350,294

(22) Filed: Nov. 14, 2016

(65) Prior Publication Data

US 2018/0023887 A1 Jan. 25, 2018

(30) Foreign Application Priority Data

Jul. 21, 2016 (KR) ........................ 10-2016-0092494

(51) Int. Cl.
  *F25B 21/04* (2006.01)
  *F25D 31/00* (2006.01)
  *F25D 17/06* (2006.01)

(52) U.S. Cl.
  CPC ............ *F25D 31/007* (2013.01); *F25B 21/04* (2013.01); *F25D 17/06* (2013.01); *F25D 31/005* (2013.01); *F25D 31/008* (2013.01); *F25D 2400/28* (2013.01); *F25D 2500/02* (2013.01)

(58) Field of Classification Search
  CPC ...... F25D 17/06; F25D 31/005; F25D 31/007; F25B 21/04
  See application file for complete search history.

(56) References Cited

U.S. PATENT DOCUMENTS

| | | | |
|---|---|---|---|
| 5,720,171 A | 2/1998 | Osterhoff et al. | |
| 6,141,969 A * | 11/2000 | Launchbury | A47J 36/2483 165/80.1 |
| 6,449,958 B1 * | 9/2002 | Foye | B60N 3/101 62/3.2 |
| 7,082,773 B2 * | 8/2006 | Cauchy | B60N 3/101 62/3.3 |
| 7,089,749 B1 * | 8/2006 | Schafer | B60H 1/00264 62/3.2 |
| 8,196,648 B2 * | 6/2012 | Matsukawa | B60N 3/104 165/202 |
| 8,657,245 B2 * | 2/2014 | Stangl | A47C 7/725 248/311.2 |
| 2004/0134200 A1 * | 7/2004 | Schroeder | F25B 21/02 62/3.7 |

(Continued)

FOREIGN PATENT DOCUMENTS

| | | |
|---|---|---|
| JP | 2003-347779 A | 12/2003 |
| KR | 10-2014-0062558 A | 5/2014 |

(Continued)

*Primary Examiner* — Filip Zec
(74) *Attorney, Agent, or Firm* — Morgan, Lewis & Bockius LLP

(57) ABSTRACT

A cooling and heating cup holder may include an inner body accommodating a drink container, a heat exchanger including an inlet formed therein while discharging air introduced by the inlet into the inner body through a blower hole, heat exchanging pins provided in the heat exchanger, a thermoelectric element having a first side entirely adhered to a rear surface of the heat exchanger, a heat radiator coupled to a second side of the thermoelectric element, an outer body forming a circulating space between the inner body and the outer body, and a blower fan transferring air to the inlet of the heat exchanger.

10 Claims, 5 Drawing Sheets

(56) References Cited

U.S. PATENT DOCUMENTS

| | | | | |
|---|---|---|---|---|
| 2007/0204629 A1* | 9/2007 | Lofy | ............... | B60N 3/104 |
| | | | | 62/3.61 |
| 2009/0199997 A1* | 8/2009 | Koplow | ............ | F04D 25/0606 |
| | | | | 165/80.3 |
| 2010/0186423 A1* | 7/2010 | Veltrop | ............. | F25B 21/04 |
| | | | | 62/3.6 |
| 2014/0175846 A1* | 6/2014 | Oh | ............. | B60N 3/104 |
| | | | | 297/180.14 |

FOREIGN PATENT DOCUMENTS

| KR | 10-2015-0045850 A | 4/2015 |
|---|---|---|
| KR | 10-2015-0071189 A | 6/2015 |
| KR | 10-2016-0036448 A | 4/2016 |

* cited by examiner

HEATING AND COOLING CUP HOLDER

CROSS-REFERENCE TO RELATED APPLICATION

The present application claims the priority benefit of Korean Patent Application No. 10-2016-0092494, filed on Jul. 21, 2016, the entire contents of which is incorporated herein for all purposes by this reference.

BACKGROUND OF THE INVENTION

Field of the Invention

The present invention relates to a heating and cooling cup holder for a vehicle configured for making cold drinks and hot drinks in the vehicle, more particularly, to a heating and cooling cup holder improving user convenience due to fast-acting properties and improvement of efficiency and raising commodity value according to improved convenience.

Description of Related Art

In general, a cup holder for accommodating a drink container is provided in a vehicle. General cup holders simply function to hold a drink container, but a cup holder capable heating and cooling the drink container is mounted in the vehicle according to a car model.

However, generally, a conventional cup holder simply cools or heats the drink using thermal conduction by contact. Cooling and heating performance only using thermal conduction is insufficient to satisfy consumer demand.

When the conventional cup holder uses a thermoelectric element, a body of the cup holder is cooled or heated by conduction and the drink container is also cooled or heated by conduction. However, in the case that a contact area between the drink container and the body of the cup holder is small, cooling and heating due to conduction is not properly performed. Namely, a size of a drink container does not always correspond to a size of the cup holder, a shape of a lower surface of the drink container is varied, and, in the case the drink container is formed of a material having low thermal conduction such as a paper cup, thermal transmission due to conduction is rarely generated, such that a temperature of the drink container is the same as ambient temperature.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling and heating cup holder improving user convenience due to fast-acting properties and improvement of efficiency and raising commodity value according to improved convenience.

It is another object of the present invention to provide a structure for improving heat exchange efficiency of a heat exchanger to improve fast-acting properties and improvement of efficiency, and for reduction of manufacturing costs.

In accordance with an aspect of the present invention, the above and other objects can be accomplished by the provision of a cooling and heating cup holder including an inner body having an open upper part to accommodate a drink container, the inner body having a cylindrical shape to surround the drink container, the inner body including a blower hole formed at a side surface thereof, into which air introduced, a heat exchanger including a front surface covering the blower hole 101 at an outside of the inner body and an inlet formed at a first side surface thereof to discharge air introduced by the inlet into the inner body through the blower hole, heat exchanging pins provided in the heat exchanger, each heat exchanging pin being formed in a direction parallel to a direction of air introduced by the inlet, the heat exchanging pins having different thicknesses, a thermoelectric element having a first surface being entirely adhered to a rear surface of the heat exchanger, a heat radiator coupled to a second side of the thermoelectric element, an outer body surrounding a lower surface and a side surface of an outer side of the inner body to form a circulating space for circulating air between the inner body and the outer body, and a blower fan provided in the circulating space to transfer air in the circulating space to the inlet of the heat exchanger.

As each heat exchanging pin extends from a central part to both ends thereof, the thickness thereof may become thin to form an inclined surface.

The heat exchanging pin overlapping with the blower hole may have a thickness smaller than the heat exchanging pin not overlapping with the blower.

The heat exchanging pin overlapping with the blower hole may have a thickness smaller than the heat exchanging pin not overlapping with the blower.

The blower hole may have a slit shape formed in a vertical direction of the inner body, and an upper part of the blower hole may extend to the upper end of the inner body to have an open shape.

The second side of the heat exchanger may be formed to be closed.

The cooling and heating cup holder may further include a discharge hole disposed at a lower end of a second part of the heat exchanger, the discharge hole discharging condensate condensed at the heat exchanging pins.

The blower hole may be formed at a center between a first side and a second side of the heat exchanger.

The outer body may surround the side surface of the inner body, the outer body may be cut at a part at which the heat exchanger is mounted to be opened, and the cut part thereof may be coupled to the heat radiator.

The outer body may have an upper end disposed higher than the upper end of the inner body. The cooling and heating cup holder may further include an extended cover extending from the upper end of the outer body to the upper end of the inner body to surround the circulating space, the extended cover extending toward an inside of the inner body.

Air supplied to the heat exchanger by the blower fan may be supplied into the inner body through the blower hole after exchanging heat with the heat exchanging pins, air supplied into the inner body may circulate around the drink container accommodated in the inner body, and then air may be introduced into the circulating space through a space between the upper end of the inner body and the extended cover.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
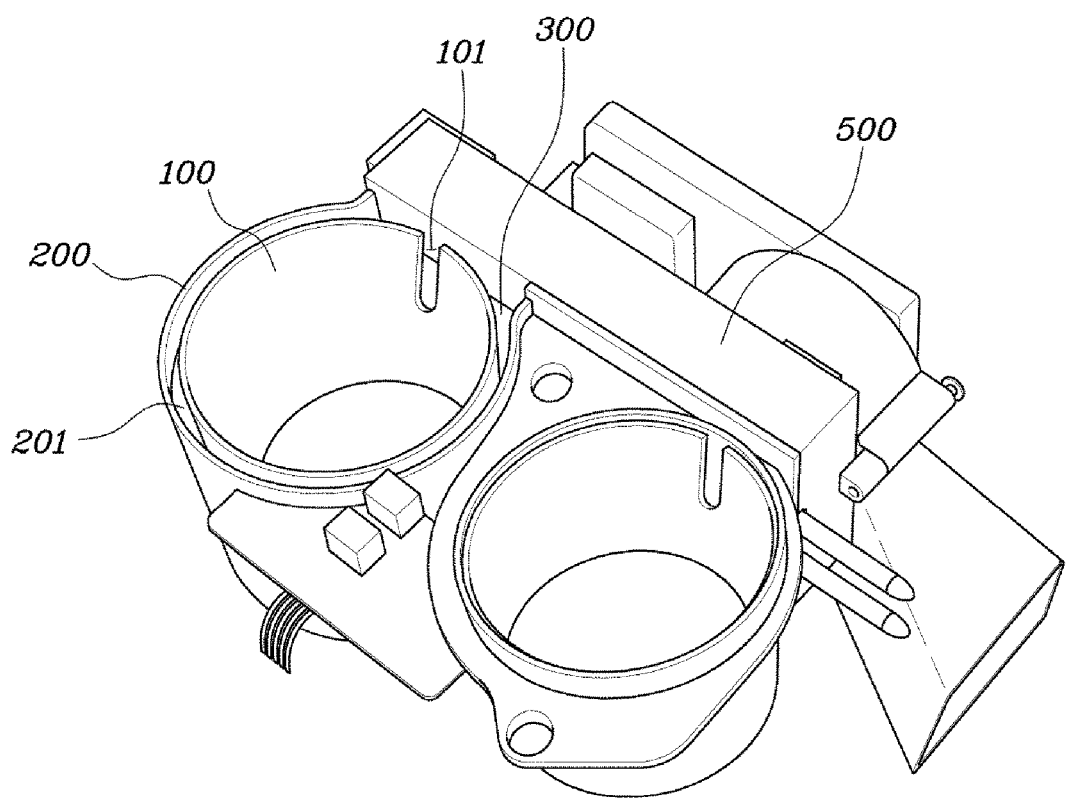
FIG. 1 is a perspective view illustrating a cooling and heating cup holder according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a light module for the vehicle according to exemplary embodiments of the present invention will be described with reference to the accompanying drawings.

Figure 2:
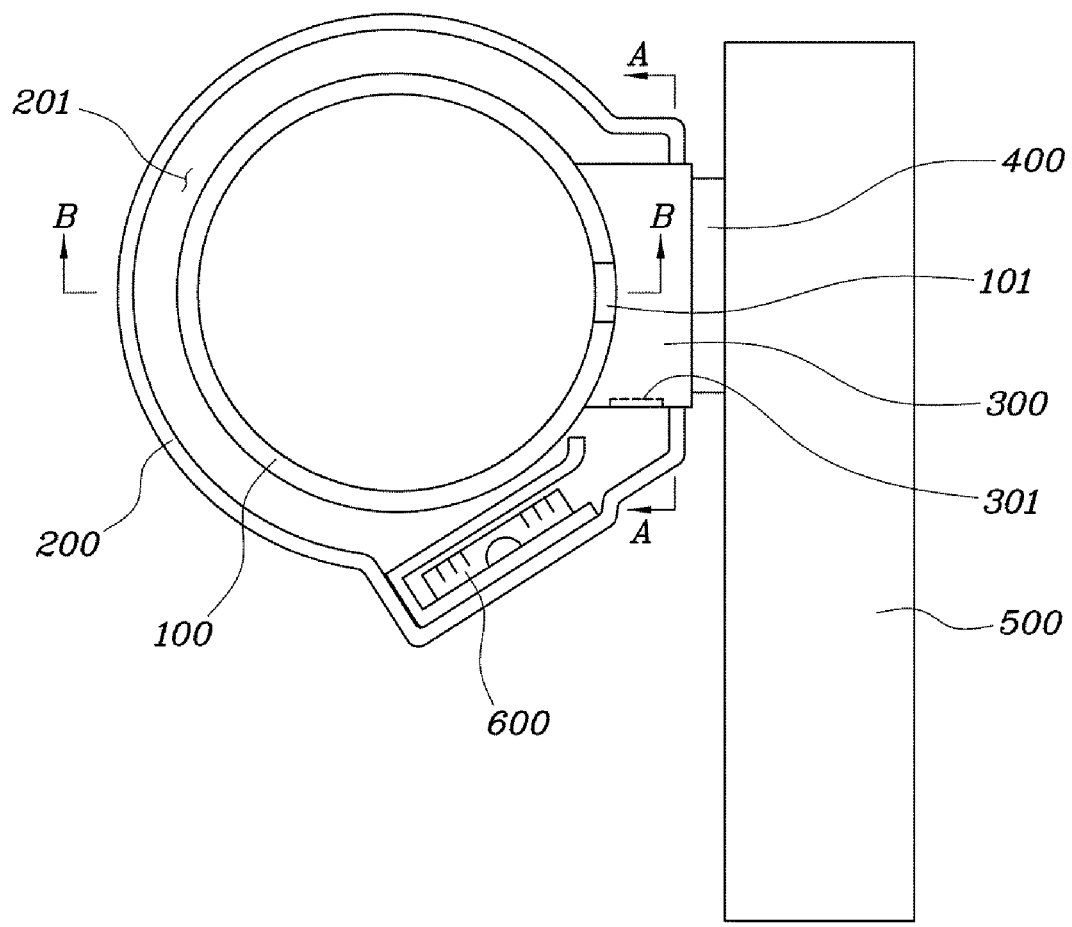
FIG. 2 is a plan view illustrating the cooling and heating cup holder according to the exemplary embodiment of the present invention.
Figure 3:
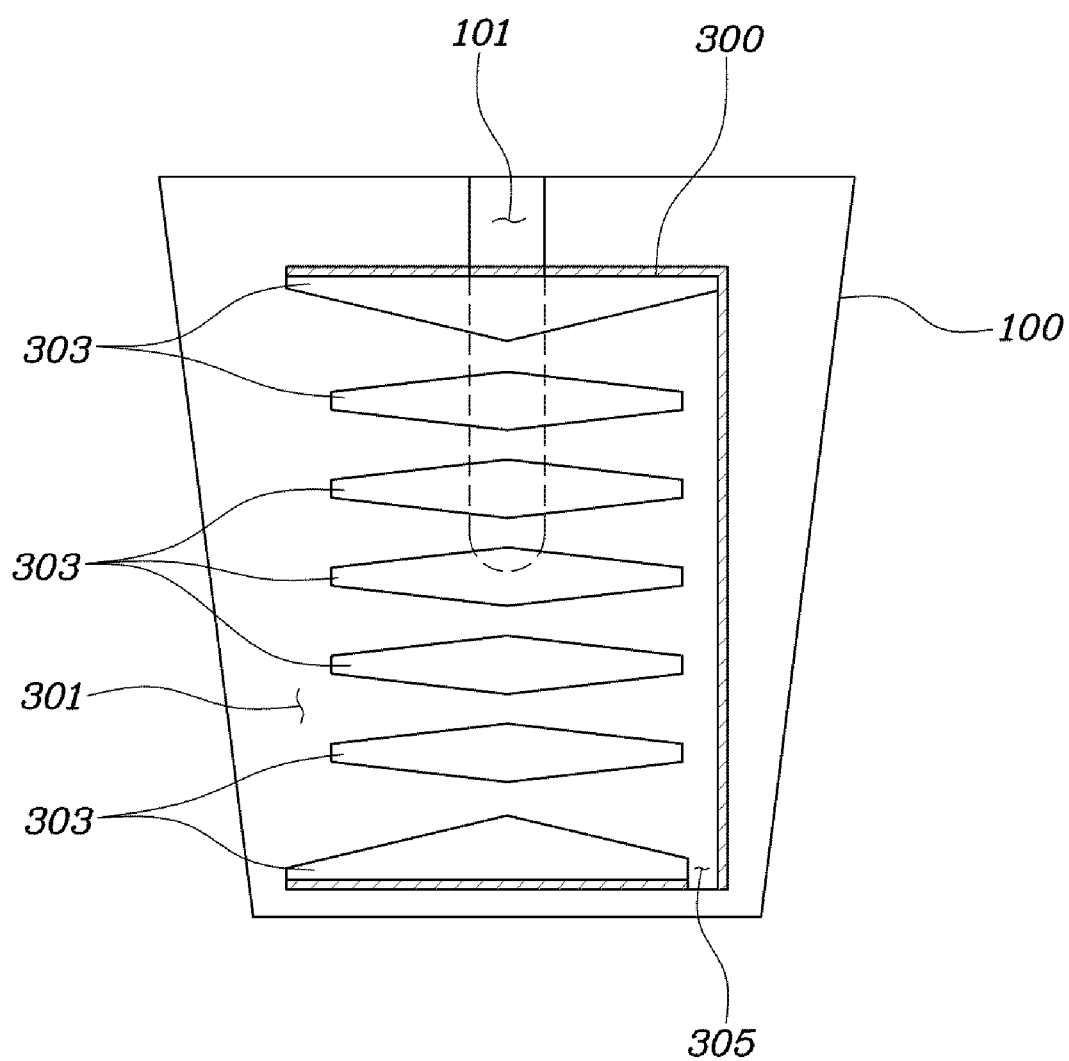
FIG. 3 is a cross-sectional view illustrating the cooling and heating cup holder taken along line A-A of FIG. 2.
Figure 4:
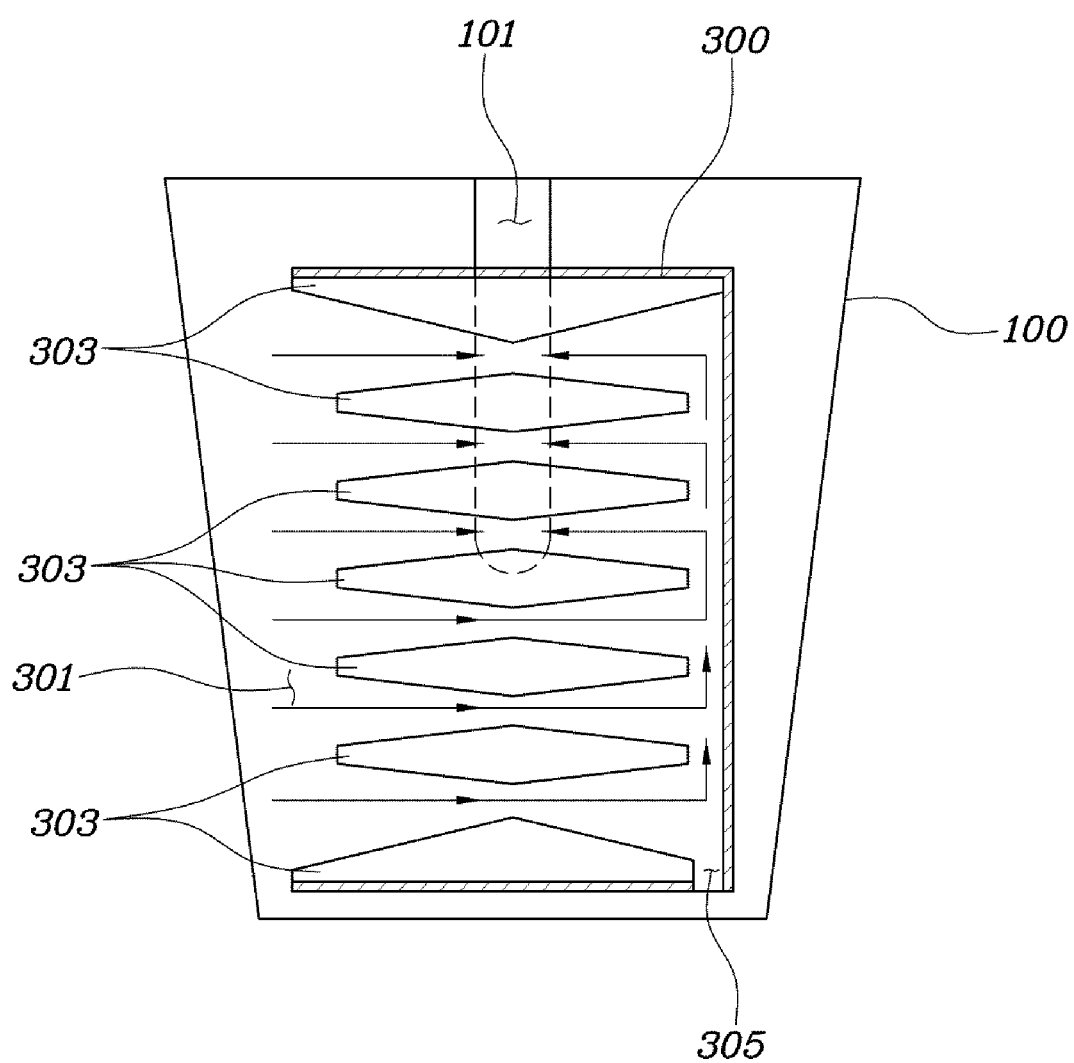
FIG. 4 is a view illustrating the air circulating path of a heat exchanger according to the exemplary embodiment of the present invention.
Figure 5:
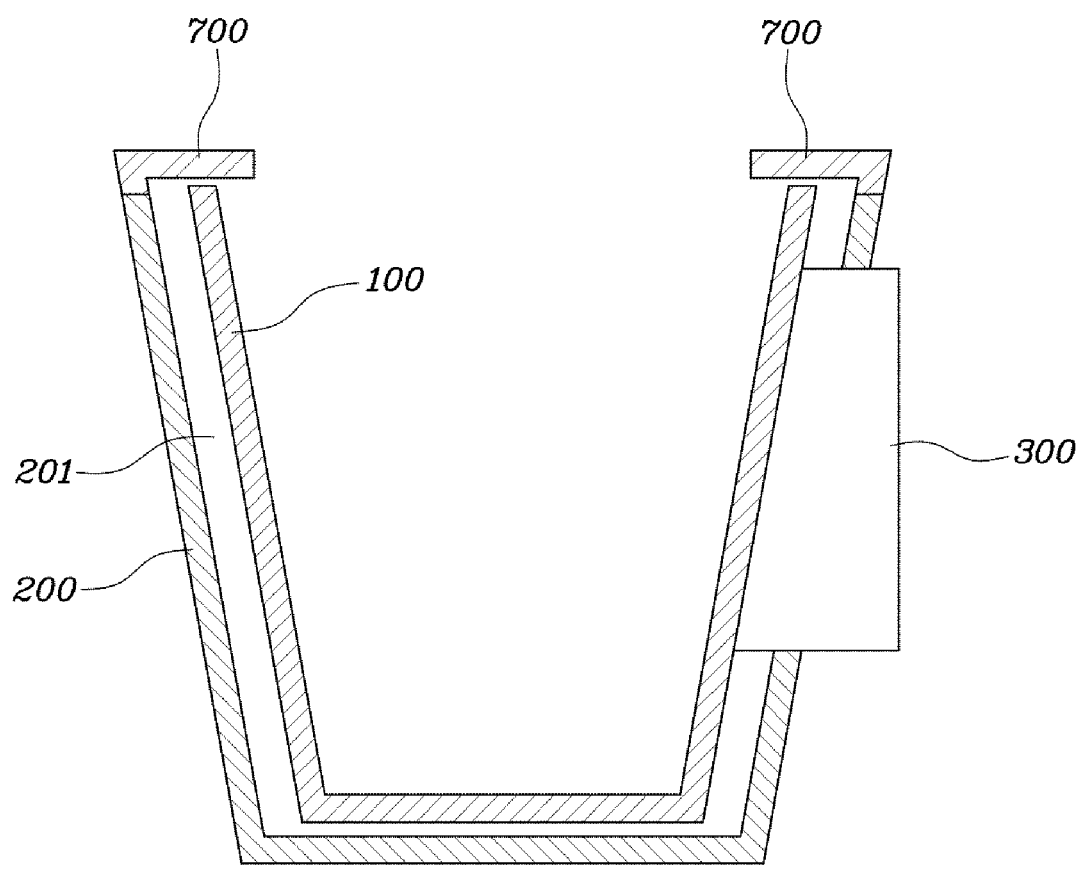
FIG. 5 is a cross-sectional view illustrating the cooling and heating cup holder taken along line B-B of FIG. 2.

FIG. 1 is a perspective view illustrating a cooling and heating cup holder according to an embodiment of the present invention. FIG. 2 is a plan view illustrating the cooling and heating cup holder according to the exemplary embodiment of the present invention. FIG. 3 is a cross-sectional view illustrating the cooling and heating cup holder taken along line A-A of FIG. 2. FIG. 4 is a view illustrating an air circulating path of a heat exchanger according to the exemplary embodiment of the present invention. FIG. 5 is a cross-sectional view illustrating the cooling and heating cup holder taken along line B-B of FIG. 2.

According to the exemplary embodiment of the present invention, the cooling and heating cup holder includes an inner body 100, a heat exchanger 300, heat exchanging pins 303, a thermoelectric element 400, a heat radiator 500, an outer body 200, and a blower fan 600. The inner body 100 has an open upper part to accommodate a drink container, has a cylindrical shape to surround the accommodated drink container, and includes a blower hole 101 formed at a side surface thereof, into which air introduced. The heat exchanger 300 has a front surface covering the blower hole 101 at an outside of the inner body, and includes an inlet 301 formed at a first side surface thereof to discharge air introduced by the inlet 301 into the inner body 100 through the blower hole 101. The heat exchanging pins 303 are provided in the heat exchanger 300, are formed in a direction parallel to a direction of air introduced by the inlet 301, and have different thicknesses. The thermoelectric element 400 has a first surface which is entirely adhered to a rear surface of the heat exchanger 300. The heat radiator 500 is connected to a second surface of the thermoelectric element 400. The outer body 200 surrounds a lower surface and a side surface of an outer side of the inner body 100 and forms a circulating space 201 to circulate air between the inner body 100 and the outer body 200. The blower fan 600 is provided in the circulating space 201 to transfer air in the circulating space 201 to the inlet 301 of the heat exchanger 300.

FIG. 1 is a perspective view illustrating a pair of the cooling and heating cup holders mounted to the vehicle. FIG. 2 is a plan view illustrating one cooling and heating cup holder for convenience of description.

The inner body 100 may be formed of a material having high thermal conductivity including metal such that conduction and convection are performed. The inner body 100 has the open upper surface to accommodate a drink container. The blower hole 101 is formed to introduce air through the inlet of the side surface of the inner body 100. The blower hole 101 is disposed adjacent an upper end side of the inner body 100.

Air introduced through the blower hole 101 passes through the heat exchanger 300 to condition air and then, conditioned air is discharged into the inner body 100. A detailed air conditioning process will be described below.

The heat exchanging pins 303 are disposed in the heat exchanger 300. Each heat exchanging pin 303 has a plate shape protruding from the rear surface of the heat exchanger 300 to be connected to the inner body 100, thereby cooling and heating the inner body 100. Air introduced through the inlet of the heat exchanger 300 is cooled or heated by the heat exchanger 300 and then, is discharged into the inner body 100 through the blower hole 101.

The conditioned air discharged into the inner body 100 is collides with a wall surface of the accommodated drink container. Air is circulated between the inner body 100 and the wall surface of the drink container to cool and heat the drink container and then, is introduced into the circulating space 201, again.

Hereinafter, a structure in which air circulated between the inner body 100 and the wall surface of the drink container is introduced into the circulating space 201 will be described.

According to FIGS. 1 and 2, the outer body 200 surrounds the side surface of the inner body 100 and is cut at a portion at which the heat exchanger 300 is mounted to be opened. The cut portion is connected to the heat radiator 500. Herein, the outer body 200 surrounds the inner body 100, the blower fan 600, and the heat exchanger 300 except for the upper end thereof to form the circulating space 201 configured for circulating air.

The upper end of the outer body 200 is higher than an upper end of the inner body 100. An extended cover 700 expands from the upper end of the outer body 200 to the upper end of the inner body 100 to surround the circulating space 201 and expands toward the inner body 100 by a predetermined distance.

After air supplied to the heat exchanger 300 by the blower fan 600 exchanges heat with the heat exchanging pins 303, air is supplied into the inner body 100 by the blower fan 600. Air supplied into the inner body 100 is circulated around the drink container accommodated in the inner body 100 and then, is introduced into the circulating space 201 through a space between the upper end of the inner body 100 and the expanded cover 700.

Herein, the cooled and heated air is not discharged but is re-circulated. Accordingly, fast-cooling and heating of the cup holder and efficiency of the cooling and heating cup holder is improved.

The blower hole 101 is a slit shape formed in a vertical direction of the inner body 100. An upper part of the blower hole 101 extends to the upper end of the inner body 100 to be opened.

Discharge of the conditioned air through the blower hole 101 is effective when air is discharged at the uppermost position of the accommodated drink container. That is, in the case that drink is cooled, conditioned air being cooled is discharged at a high position (i.e., a position higher than a predetermined position) to cool the drink such that the drink is mixed by vertical convection of the drink in the drink container to be uniformly cooled.

Meanwhile, the blower hole 101 is a slit shape. Herein, the reason why the upper part of the blower hole 101 extends to the upper end of the inner body 100 to be opened is to mold the exchanger 300 and the inner body 100 integrally.

Alternatively, the heat exchanger 300 and the inner body 100 are produced, respectively, and then a post-process of welding the inner body 100 to the heat exchanger 300 may be performed. However, in this case, it is very difficult to manufacture the heat exchanger 300. This is because a plurality of heat exchanging pins 303 is formed in the heat exchanger 300 and the heat exchanging pins 303 are manufactured to have different shapes.

In detail, the heat exchanging pins 303 are connected to the side surface of the inner body. As a diameter of the inner body 100 becomes large from a lower part to the upper part, protruding degree of the heat exchanging pin 303 disposed at the upper part of the inner body 100 is lower than protruding degree of the heat exchanging pin 303 disposed at the lower part of the inner body 100. In the case that the inner body 100 has a cylindrical shape, each heat exchanging pin 303 may be manufactured to have a curved central part corresponding to a curvature of the inner body 100.

Furthermore, in a process of welding the heat exchanger 300 to the inner body 100, material properties are changed at a welding portion and efficiency of thermal conductivity is decreased. In addition, precise machining of the heat exchanger 300 and the post-process of welding causes manufacturing costs to rise.

Meanwhile, in the case that the heat exchanger 300 and the inner body 100 are formed integrally using a process method including die casting, manufacturing costs are reduced, manufacturing speed is increased due to absence of the post-process, and thermal conductivity between the heat exchanger 300 and the inner body 100 is excellent. Accordingly, efficiency of thermal conductivity is increased.

In the blower hole 101 formed at the inner body 100, the blower hole 101 transpierces the side surface of the inner body 100 such that a path through which a part of a mold for forming the blower hole 101 is separated is necessary. Herein, the blower hole 101 is formed to have the open upper part such that the open upper part is provided as a removal path of the mold for forming the blower hole 101.

A thickness of the heat exchanging pin 303 overlapping with the blower hole 101 may be smaller than a thickness of the heat exchanging pin 303 not overlapping with the blower hole 101.

According to an exemplary embodiment of the present invention, the cooling and heating cup holder, as described above, performs cooling and heating functions through conduction and convention of air. Cooling and heating by conduction is performed by transferring cooling air and heating air generated by the thermoelectric element 400 to the inner body 100 through a part contacting the heat exchanger 300 and the inner body 100. Accordingly, as a contact area of the inner body 100 and the heat exchanger 300 is large and as the heat exchanger 300 is formed of a metal bulk having high thermal conductivity, cooling air and heating air generated by the thermoelectric element 400 is readily transferred to the inner body 100. Meanwhile, the heat exchanger 300 is configured to cool and heat air by conduction and to condition air to be supplied into the inner body 100 such that an area of the heat exchanger 300 is adjusted by a size of a flow path through which conditioned air passes to be supplied to the blower hole 101.

Thus, the area of each heat exchanging pin 303 is adjusted by the thickness thereof according to an exemplary embodiment of the present invention. In detail, when the heat exchanging pins 303 are adjusted to have a same thicknesses, the blower hole 101 may be blocked by the heat exchanging pins 303. Accordingly, the heat exchanging pin 303 overlapping with the blower hole 101 is thinner than the heat exchanging pin 303 not overlapping with the blower hole 101 to secure a space for the blower hole 101 and maximum contact area for thermal conduction.

As each heat exchanging pin 303 extends from a central part to both ends, the thickness thereof becomes thin such that an inclined surface may be formed thereon.

When the cooling and heating cup holder operates in a cooling mode, a temperature of each heat exchanging pin 303 is very low using the thermoelectric element 400. Herein, moisture in the air may be condensed on the surface of the heat exchanging pins 303. As illustrated in FIG. 3 and FIG. 4, the central part of each heat exchanging pin 303 is thick and the heat exchanging pin 303 becomes thin toward both edges thereof to form the inclined surface. Accordingly, the condensed moisture may naturally flow. The condensed moisture is discharged to an outside through a discharge hole 305 disposed at a lower end of the other surface of the heat exchanger 300.

Both ends of each heat exchanging pin 303 may be formed to be spaced from one side or the other side of the heat exchanger 300. The other side of the heat exchanger 300 may be formed to be closed.

Referring to FIG. 4, one side of the heat exchanger 300 is open to introduce air by the blower fan 600 and the other side thereof 300 is closed to entirely discharge the introduced air through the blower hole 101. Herein, since both ends of the heat exchanging pin 303 are formed to be spaced from one side and the other side of the heat exchanger 300, air may circulate around the heat exchanging pins 303.

In particular, in the case that the flow path between the heat exchanging pins 303 is a lower flow path, which is not directly contacted to the blower hole 101, the heat exchanging pin 303 is in contact with the other side of the heat exchanger 300 to block the flow path. Accordingly, it is impossible to condition air through the heat exchanging pin 303, which is disposed at the lower part. Accordingly, as both ends of each heat exchanging pin 303 are spaced from the other side of the heat exchanger 300, the air flow path is secured, and as such, the lower heat exchanging pin 303 may be used for air conditioning.

The blower hole 101 may be formed at a center of one side and the other side of the heat exchanger 300.

As the blower hole 101 is disposed at a center of the heat exchanger 300, a pair of the inner bodies 100 may be used without distinction of left or right cooling and heating cup holders. Accordingly, there is an advantage in that manufacturing costs may be reduced.

As is apparent from the above description, according to a cooling and heating cup holder, thermal resistance at a coupling part between components is reduced to increase thermal conduction efficiency, thereby increasing efficiency of the entire cooling and heating cup holder. Furthermore, in the case of a pair of cup holders, the cup holders may be used without distinction of left or right components to decrease manufacturing costs.

Although the preferred embodiments of the present invention have been described above with reference to the accompanying drawings, those skilled in the art will appreciate that the present invention can be implemented in various other embodiments without changing the technical ideas or features thereof.

What is claimed is:

1. A cooling and heating cup holder comprising:
   an inner body having an open upper part to accommodate a drink container, the inner body having a cylindrical shape to surround the drink container, the inner body including a blower hole formed at a side surface of the inner body, into which air is introduced;
   a heat exchanger including a front surface covering the blower hole at an outside of the inner body and an inlet formed at a first side surface of the heat exchanger and discharging the air introduced by the inlet into the inner body through the blower hole;
   a plurality of heat exchanging pins provided in the heat exchanger, each of the plurality of heat exchanging pins being formed in a direction parallel to a direction of the air introduced by the inlet;
   a thermoelectric element having a first surface being attached to a rear surface of the heat exchanger;
   a heat radiator coupled to a second side of the thermoelectric element;
   an outer body surrounding a lower surface and a side surface of an outer side of the inner body to form a circulating space for circulating air between the inner body and the outer body; and
   a blower fan provided in the circulating space to transfer air in the circulating space to the inlet of the heat exchanger,
   wherein, among the plurality of heat exchanging pins, a thickness of the heat exchanging pin overlapping with the blower hole is smaller than a thickness of the heat exchanging pin not overlapping with the blower hole.

2. The cooling and heating cup holder according to claim 1, wherein, as each of the plurality of heat exchanging pins extends from a central part to both ends thereof of each of the plurality of heat exchanging pins, a thickness of each of the plurality of heat exchanging pins reduces to form an inclined surface.

3. The cooling and heating cup holder according to claim 1, wherein both ends of each of the plurality of heat exchanging pins are formed to be spaced from a first side and a second side of the heat exchanger.

4. The cooling and heating cup holder according to claim 1, wherein the blower hole has a slit shape formed in a vertical direction of the inner body, and an upper part of the blower hole extends to an upper end of the inner body to have an open shape.

5. The cooling and heating cup holder according to claim 1, wherein a second side of the heat exchanger is formed to be closed.

6. The cooling and heating cup holder according to claim 1, further including a discharge hole disposed at a lower end of a second part of the heat exchanger, the discharge hole discharging condensate condensed at the plurality of heat exchanging pins.

7. The cooling and heating cup holder according to claim 1, wherein the blower hole is formed at a center between a first side and a second side of the heat exchanger.

8. The cooling and heating cup holder according to claim 1, wherein the outer body surrounds the side surface of the inner body, the outer body is cut at a part at which the heat exchanger is mounted to be opened, and the cut part thereof is coupled to the heat radiator.

9. The cooling and heating cup holder according to claim 1,
   wherein the outer body has an upper end disposed higher than an upper end of the inner body, and
   wherein an extended cover extends from the upper end of the outer body to the upper end of the inner body to surround the circulating space, the extended cover extending toward an inside of the inner body.

10. The cooling and heating cup holder according to claim 9, wherein air supplied to the heat exchanger by the blower fan is supplied into the inner body through the blower hole after exchanging heat with the plurality of heat exchanging pins, air supplied into the inner body circulates around the drink container accommodated in the inner body, and then air is introduced into the circulating space through a space between the upper end of the inner body and the extended cover.

* * * * *